United States Patent
Marupaduga et al.

(10) Patent No.: US 10,548,141 B1
(45) Date of Patent: Jan. 28, 2020

(54) DYNAMIC CARRIER ALLOCATION BASED ON DUAL-CONNECTIVITY CAPABILITY

(71) Applicant: Sprint Spectrum L.P., Overland Park, KS (US)

(72) Inventors: Sreekar Marupaduga, Overland Park, KS (US); Rajveen Narendran, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/418,323

(22) Filed: May 21, 2019

(51) Int. Cl.
*H04W 24/00* (2009.01)
*H04W 72/04* (2009.01)
*H04L 5/00* (2006.01)

(52) U.S. Cl.
CPC ......... *H04W 72/048* (2013.01); *H04L 5/0032* (2013.01)

(58) Field of Classification Search
None
See application file for complete search history.

(56) References Cited

U.S. PATENT DOCUMENTS

2016/0262188 A1* 9/2016 Zhang .................. H04B 7/2662

* cited by examiner

*Primary Examiner* — Suhail Khan

(57) ABSTRACT

A base station that is configured to provide first-RAT service on multiple carriers will reserve at least one of the carriers for use in providing UEs with dual-connectivity service on the first RAT and a second RAT, and the base station will reserve at least one other of the carriers for use in providing UEs with standalone first-RAT service. For instance, a 4G base station that is configured to provide 4G service on multiple 4G carriers could reserve at least one of those 4G carriers for use in providing UEs with EN-DC service (where each UE would be served concurrently on a 5G carrier as well) and could reserve another one of those 4G carriers for use in providing UEs with standalone 4G service.

15 Claims, 3 Drawing Sheets

DYNAMIC CARRIER ALLOCATION BASED ON DUAL-CONNECTIVITY CAPABILITY

BACKGROUND

A cellular wireless network typically includes a number of cell sites including base stations that are configured to provide wireless coverage areas in which user equipment devices (UEs) such as cell phones, tablet computers, machine-type-communication devices, tracking devices, embedded wireless modules, and/or other wirelessly equipped communication devices (whether or not user operated) can operate. Further, each base station could be coupled with a core network that provides connectivity with various application servers and/or transport networks, such as the public switched telephone network (PSTN) and/or the Internet for instance. With this arrangement, a UE within coverage of the cellular network could engage in air interface communication with a base station and could thereby communicate via the base station with various application servers and other entities.

Such a network could operate in accordance with a particular radio access technology (RAT), with communications from the base stations to UEs defining a downlink or forward link and communications from the UEs to the base stations defining an uplink or reverse link.

Over the years, the industry has embraced various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each coverage area could operate on one or more radio-frequency (RF) carriers, each of which could be frequency division duplex (FDD), defining separate frequency channels for downlink and uplink communication, or time division duplex (TDD), with a single frequency channel multiplexed over time between downlink and uplink use. Further, on the downlink and uplink, each carrier could be structured to define various physical channels including time-frequency resources for carrying information between the base station and UEs. For example, the air interface could be divided over time into frames, each divided in turn into subframes and timeslots, and the carrier bandwidth (frequency width of the carrier on the downlink and/or uplink) could be divided over frequency into subcarriers, which could be grouped within each timeslot to define physical resource blocks (PRBs) in which the subcarriers can be modulated to carry data.

OVERVIEW

When a UE enters into coverage of an example network, the UE could detect threshold strong coverage of a base station on a particular carrier (e.g., a threshold strong reference signal broadcast by the base station on that carrier) and could then engage in random-access and Radio Resource Control (RRC) signaling to establish an RRC connection through which the base station will then serve the UE on the carrier. Further, if the UE is not already registered for service with the core network, the UE could transmit to the base station an attach request, which the base station could forward to a core-network controller for processing. And the core-network controller and base station could then coordinate setup for the UE of one or more bearers extending between the UE and a core-network gateway that provides transport-network connectivity.

Once the UE is so connected and registered, the base station could then serve the UE in a connected mode, managing downlink air-interface communication of packet data to the UE and uplink air-interface communication of packet data from the UE.

For example, when packet data for the UE arrives at the core network from a transport network, the data could flow to the UE's serving base station, and the base station could then schedule and provide transmission of that data to the UE on particular downlink PRBs of the carrier. Likewise, when the UE has data to transmit on the transport network, the UE could transmit a scheduling request to the base station, the base station could responsively schedule transmission of that data from the UE on particular uplink PRBs of the carrier, and the UE could accordingly transmit the data to the base station for forwarding through the core network to the transport network.

As the industry advances from one generation of wireless technology to the next, networks and UEs may also support simultaneous connectivity on connections according to multiple different RATs. With the transition from 4G to 5G, for instance, a wireless operator that provides cell sites with 4G base stations could upgrade those cell sites to include 5G base stations as well and to support an arrangement referred to as EUTRA-NR Dual Connectivity (EN-DC). Further, new UEs could be configured with both 4G and 5G radios and with logic and service subscriptions to support EN-DC operation.

With EN-DC, a cell site's 4G base station functions a master node and anchor for signaling with the core network and RRC signaling with the UE, and the cell site's 5G base station functions as a secondary node to provide added connectivity for served UEs.

When a UE that supports EN-DC service enters into such a cell site, the UE could initially scan for and detect coverage of the cell site's 4G base station and engage in signaling to establish a 4G connection between the UE and the 4G base station as discussed above. In turn, perhaps having determined from profile data that the UE is EN-DC capable, the 4G base station could then work with the core network, with the 5G base station, and with the UE to establish a 5G connection between the UE and the 5G base station and to establish bearer connectivity for the UE between the 5G base station and the core network. With these 4G and 5G connections so established, the 4G and 5G base stations could then serve the UE with packet-data communications concurrently on their respective connections with the UE, with a portion of data flowing over the UE's 4G connection with the 4G base station concurrently with another portion of the data flowing over the UE's 5G connection with the 5G base station.

More generally, dual-connectivity service of a UE may involve the UE having co-existing connections according to multiple different RATs and being served with communication concurrently on those multiple different-RAT connections, which might provide the UE with increased peak data rate. This is distinct from standalone (or single-connectivity)

service of a UE, where the UE is served with communication according to just a single RAT, such as with just a 4G connection or just a 5G connection.

When a wireless operator upgrades or otherwise configures its network to support providing dual-connectivity service on a first RAT and a second RAT, the development and/or use of UEs that are configured to support that dual-connectivity service may be progressive. For at least some time, though many UEs served by the operator's network may support engaging in standalone service on the first RAT, only some of those UEs may also support engaging in dual-connectivity service on the first RAT and the second RAT.

By way of example, when an operator upgrades or otherwise configures its network to support providing EN-DC service, many UEs served by the network may support engaging in standalone 4G service, but only some of those UEs may also support engaging in EN-DC service. For instance, while all of the UEs may include 4G radios and logic and/or service subscriptions that enable the UEs to engage in 4G service, just some of the UEs may also include 5G radios and logic and/or service subscriptions that enable the UEs to engage in EN-DC service.

In this or similar situations, it may be worthwhile to reserve sufficient air-interface capacity on the first RAT for use in providing dual-connectivity service to UEs that support dual-connectivity service. For instance, in a network that supports EN-DC service, it may be worthwhile to reserve sufficient 4G air-interface capacity for use in providing EN-DC service to UEs that support EN-DC service.

The present disclosure provides a mechanism to help achieve this goal. In accordance with the disclosure, a base station that is configured to provide first-RAT service on multiple carriers will reserve at least one of the carriers for use in providing UEs with dual-connectivity service on the first RAT and a second RAT, and the base station will reserve at least one other of the carriers for use in providing UEs with standalone first-RAT service. For instance, a 4G base station that is configured to provide 4G service on multiple 4G carriers could reserve at least one of those 4G carriers for use in providing UEs with EN-DC service (where each UE would be served concurrently on a 5G carrier as well) and could reserve another one of those 4G carriers for use in providing UEs with standalone 4G service.

To implement this in practice, the base station could thus have at least one carrier that the base station has reserved for use in providing dual-connectivity service ("dual-connectivity carrier") and at least one carrier that the base station has reserved for use in providing standalone first-RAT service ("standalone carrier").

If and when a UE connects with the base station on the dual-connectivity carrier, the base station could then refer to UE-capabilities data to determine whether the UE is dual-connectivity capable. And if the base station thereby determines that the UE is dual-connectivity capable, then the base station could responsively serve the UE on the dual-connectivity carrier on which the UE is connected. Whereas, if the base station thereby determines that the UE is not dual-connectivity capable, then the base station could responsively transfer the UE to instead be connected on the standalone carrier and could then serve the UE on the standalone carrier.

Likewise, if and when a UE connects with the base station on the standalone carrier, the base station could refer to UE-capabilities data to determine whether the UE is dual-connectivity capable. And if the base station thereby determines that the UE is dual-connectivity capable, then the base station could responsively transfer the UE to instead be connected on the dual-connectivity carrier and could then serve the UE on the dual-connectivity carrier. Whereas, if the base station thereby determines that the UE is not dual-connectivity capable, then the base station could responsively serve the UE on the standalone carrier on which the UE is connected.

Alternatively, other implementations could be possible as well. For instance, the base station could be configured to not advertise service on the dual-connectivity carrier, so that UEs scanning for coverage would not connect with the base station on that carrier but would rather connect with the base station on the standalone carrier. When a UE connects with the base station on the standalone carrier, processing could then occur as described above, with the base station determining whether the UE is dual-connectivity capable and, if so, transferring the UE to the dual-connectivity carrier.

Further, transferring of the UE from the standalone carrier to the dual-connectivity carrier could be done upon initial connection by the UE on the standalone carrier and/or if and when the base station is going to coordinate setup of dual-connectivity service for the UE and thus in preparation for setup of the dual-connectivity service for the UE.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

Figure 1:
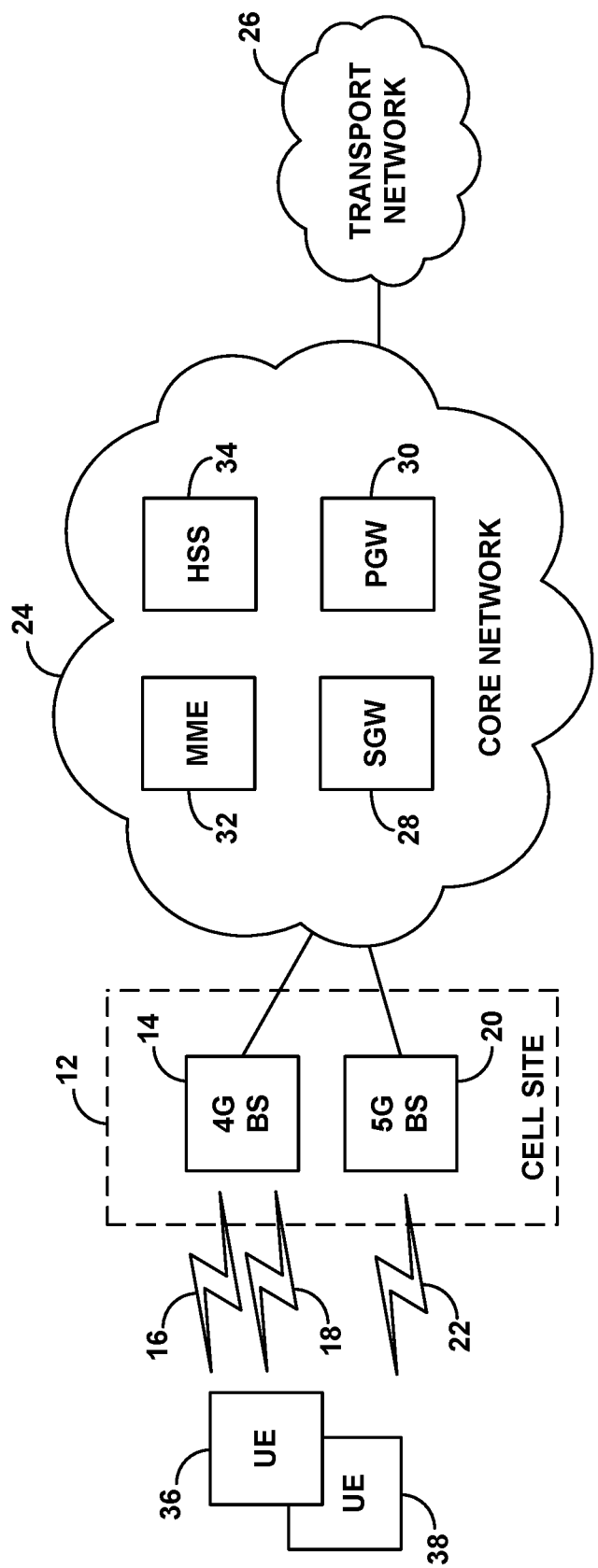
FIG. 1 is a simplified block diagram of an example wireless communication system in which various disclosed features can be implemented.

An example implementation will now be described in the context of 4G LTE and 5G NR service and particularly in the context of a network that includes a cell site having a 4G base station and a 5G base station, with the 4G base station being configured to operate on multiple carriers and supporting both 4G-only service and EN-DC service. It should be understood, however, that the principles disclosed herein could extend to apply with respect to other scenarios as well, such as with respect to other RATs and other dual-connectivity configurations, including for instance with non-collocated 4G and 5G base stations. Further, it should be understood that other variations from the specific arrangements and processes described are possible. For instance, various described entities, connections, functions, and other elements could be added, omitted, distributed, re-located, re-ordered, combined, or changed in other ways.

As noted above, FIG. 1 is a simplified block diagram of an example wireless communication system in which various disclosed features can be implemented. In particular, the figure depicts a representative arrangement including an EN-DC-capable cell site 12 having a 4G base station 14 that provides 4G coverage on at least two example 4G carriers 16, 18, and a 5G base station 20 that provides 5G coverage on an example 5G carrier 22. For simplicity, we can assume that the 4G coverage overlaps or is largely coterminous with the 5G coverage, so that a UE can operate concurrently in the 4G coverage and the 5G coverage.

In addition, each base station could also take various forms. For instance, a base station could be a macro base station of the type that would typically include a tower mounted antenna structure for providing a broad range of coverage. Or a base station could be a small cell base station, femtocell base station, relay base station, or other type of base station that might have a smaller form factor with an antenna structure that provides a narrower range of coverage. Further, base stations might share an antenna tower and/or other equipment with each other. Other arrangements are possible as well.

Base stations 14, 20 are each shown coupled with an example core network 24. Core network 24 could be an evolved packet core (EPC) network, a next generation core (NGC) network, or another network including components supporting an applicable radio access technology and providing connectivity with at least one transport network 26, such as the Internet.

In an example implementation as shown, the core network 24 includes a serving gateway (SGW) 28, a packet data network gateway (PGW) 30, a mobility management entity (MME) 32, and a home subscriber server (HSS) 34. In practice, each base station could have an interface with the SGW and an interface with the MME, the MME could have an interface with the SGW and an interface with the HSS, the SGW could have an interface with the PGW, and the PGW could provide connectivity with the transport network.

With this arrangement, the SGW and PGW could cooperatively provide user-plane connectivity between each base station and the transport network, to enable a UE served by a base station to engage in communication on the transport network. Further, the MME could operate as a core-network controller to carry out operations such as coordinating UE attachment and setup of user-plane bearers. And the HSS could store UE profile records, which could specify service-subscription plans, UE configurations, and/or other such UE capability information.

As noted above, the air interface between each base station and UEs within its coverage could be structured to define various air-interface resources.

By way of example, in the time domain, the air interface could define a continuum of 10-millisecond (ms) frames, each divided into ten 1-ms subframes, and each subframe could be further divided into a number of timeslots, each additionally divided into symbol time segments. And in the frequency domain, the bandwidth of each carrier on which the base station operates could be divided into subcarriers with specified subcarrier spacing on the order of 15 to 240 kHz. With this example arrangement, the air interface on each carrier would define an array of resource elements each occupying a subcarrier and symbol time segment, and the base station and UEs could communicate with each other through modulation of the subcarriers to carry data in those resource elements. Variations of this arrangement are possible as well.

Further, particular sets of resource elements on the air interface could be grouped together to define the PRBs discussed above. In an example implementation, each PRB could span one timeslot in the time domain and a group of subcarriers in the frequency domain. Depending on the carrier bandwidth, the air interface could thus support a certain number of such PRBs across the bandwidth of the carrier within each timeslot.

In addition, certain resource elements on the downlink and uplink could be reserved for particular control-channel or shared-channel communications.

For instance, on the downlink, certain resource elements per subframe (or per downlink subframe in TDD) could be reserved to define a downlink control region for carrying control signaling such as scheduling directives and acknowledgements from the base station to UEs. And other resource elements per subframe could be reserved to define a shared channel in which PRBs could carry scheduled data communications from the base station to UEs.

Further, in certain subframes, a group of resource elements centered on the center frequency of each carrier could be reserved to carry synchronization signals that UEs could detect as a way to discover coverage of the base station on the carrier and to establish frame timing. And in certain subframes, a group of resource elements also centered on the center frequency of the carrier could be reserved to define a broadcast-channel for carrying system information messages, such as master information block (MIB) and system information block (SIB) messages that UEs could read to obtain operational parameters such as carrier bandwidth (e.g., downlink bandwidth and/or uplink bandwidth) and other information. Further, certain resource elements distributed in a predefined pattern throughout the carrier bandwidth per subframe could be reserved to carry reference signals that UEs could measure as a basis to evaluate coverage strength and quality and to provide channel estimates to facilitate precoding, beamforming, or the like.

On the uplink, on the other hand, certain resource elements per subframe (or per uplink subframe in TDD) could be reserved to define an uplink control region for carrying control signaling such as access requests, channel-quality reports, scheduling requests, and acknowledgements, from UEs to the base station. And other resource elements per subframe could be reserved to define a shared channel in which PRBs could carry scheduled data communications from UEs to the base station. Further, still other resources on the uplink could be reserved for other purposes as well, such as for carrying uplink reference signals or the like.

Note also that the 4G air interface and 4G service provided by 4G base stations 14 on a 4G carrier could differ from the 5G air interface and 5G service provided by 5G base station 20 in various ways now known or later developed. For example, one may provide variable subcarrier spacing, but the other may provide fixed subcarrier spacing. As another example, one may have different symbol time segments than the other. As still another example, one may make use of different MIMO technologies than the other. And as yet another example, with TDD carriers, one may have a flexible TDD configuration and the other may have a fixed TDD configuration. Other examples are possible as well.

FIG. 1 further shows two representative UEs 36, 38 within coverage of at least 4G base station 14 and perhaps additionally within coverage of 5G base station 20. For present purposes, we could assume that both of these UEs support engaging in standalone 4G service but that, of the two UEs, only UE 36 also supports engaging in EN-DC service. Further, in an example implementation, the HSS 34 could hold capabilities data for each of these UEs indicating respectively for each UE whether the UE is EN-DC-capable. Thus, the capabilities data for UE 36 could indicate that UE 36 is EN-DC-capable, and the capabilities record for UE 38 could indicate (e.g., expressly or by omission) that UE 38 is not EN-DC capable. In addition or alternatively, the UEs themselves might be provisioned with such an indication of their capabilities or lack thereof.

In general operation, when each such UE enters into coverage of the 4G base station, the UE could detect the 4G base station's synchronization signal on a given one of carriers 16, 18 and could then read the base station's MIB or the like on the carrier to determine the carrier's bandwidth and could read the base station's SIB to determine other operational parameters. Further, the UE could determine coverage strength from the 4G base station on the carrier, such as reference signal receive strength (RSRP) or reference signal receive quality (RSRQ), among other possibilities. And if the UE determines that the coverage is sufficiently strong, the UE could then engage in random access signaling and RRC configuration signaling with the 4G base station as discussed above to connect with the 4G base station on the carrier, thus putting the UE in an RRC-connected mode. Further, the 4G base station could establish in data storage a context for the UE, recording in the context record an identification of the UE's established RRC connection and an identification of the carrier on which the UE is connected with the 4G base station.

In addition, once the UE is connected with the 4G base station, the UE could then transmit to the 4G base station an attach request if appropriate, which the base station could forward to the MME for processing as discussed above. And after authenticating the UE, the MME could coordinate setup for the UE of a user-plane bearer between the 4G base station and the PGW, to enable the UE to engage in communication on the transport network. Further, the 4G base station could coordinate establishment for the UE of a corresponding data radio bearer between the UE and the 4G base station, and the base station could record the operational state of the UE in the UE context record.

In relation to this attachment process or at another time, the 4G base station could also obtain capabilities data regarding the UE and could store the capabilities data in the UE context record for reference while serving the UE. For instance, during the attachment process, the MME could obtain this data from the HSS and could covey the data to the 4G base station for storage. Alternatively or additionally, the UE could provide the base station with a capabilities-report that conveys this data to the 4G base station for storage.

In a representative implementation, this capabilities data will indicate at least whether the UE is EN-DC capable. For instance, the capabilities data could be set forth as a feature group indicator (FGI) bit string in which each bit is a Boolean indication of whether or not UE supports a corresponding feature. One such but could be an indication of whether the UE is EN-DC capable (which, as noted above, might be based on whether the UE includes both 4G and 5G radios and associated logic and/or service subscription, among other possibilities). For instance, having the EN-DC-capability bit be set to "1" could indicate that the UE is EN-DC capable, and having the EN-DC-capability bit be set to "0" could indicate that the UE is not EN-DC capable. Other mechanisms for conveying UE capability information could be used as well.

Once the UE is so connected with the 4G base station on a particular carrier, the 4G base station could then provide the UE with data communication service on that carrier as discussed above.

For instance, when data arrives at the 4G base station for transmission to the UE, the 4G base station could allocate one or more downlink PRBs in a subframe on the carrier for use to transmit at least a portion of the data, defining a transport block, to the UE. The 4G base station could then transmit to the UE in the control region of that subframe on the carrier a Downlink Control Information (DCI) message that designates the PRBs, and the 4G base station could accordingly transmit the transport block to the UE in those designated PRBs on the carrier.

And when the UE has data to transmit to the 4G base station (e.g., for transmission on the transport network), the UE could transmit to the 4G base station on the carrier a scheduling request that carries with it a buffer status report (BSR) indicating how much data the UE has buffered for transmission. And in response the 4G base station, could allocate one or more uplink PRBs in an upcoming subframe on the carrier for carrying a transport block of that data from the UE and could transmit to the UE on the carrier a DCI message that designates those upcoming PRBs. The UE could then accordingly transmit the transport block to the 4G base station in the designated PRBs.

As UEs 36 and 38 each support standalone 4G service, each of UEs 36, 38 could thus connect with and be served by the 4G base station in this manner on a 4G carrier. Further, by reference to the capabilities data of UE 38, the 4G base station could determine that UE 38 is not EN-DC capable; therefore, the 4G base station's service of UE 36 might be limited to standalone 4G service. Whereas, by reference to the capabilities data of UE 36, the 4G base station could determine that UE 36 is EN-DC capable, and on this basis (and possibly in response to one or more other triggering factors), the 4G base station could coordinate setup of EN-DC service for UE 36.

The process of coordinating setup or dual-connectivity service for UE 36 could involve signaling over an inter-base-station interface (e.g., an X2 interface) with the 5G base station 20 and with the UE to coordinate setup of a 5G connection on 5G carrier 22 between the UE and the 5G base station. Further, the process could include working with the 5G base station and perhaps with the MME, to coordinate setup for the UE of a split user-plane bearer so that a portion of the UE's user-plane communications could be served by the 4G base station 14 and another portion of the UE's user-plane communications could be served by the 5G base station 20. This split bearer could be set up in various ways, such as (i) at the SGW, with one leg extending between the SGW and the 4G base station and another leg extending between the SGW and the 5G base station, (ii) at the 4G base station, with the UE's 5G communications passing over an interface between the 4G and 5G base stations, or (iii) at the 5G base station, with the UE's 4G communications passing over an interface between the 4G and 5G base stations.

Once EN-DC service is set up for UE 36, the 4G and 5G base stations could then both serve UE 36 concurrently with packet-data communications. For instance, each base station could schedule and provide downlink data communication to the UE over its respective connection with the UE, and each base station could schedule and receive uplink communication from the UE over its respective connection with the UE. Alternatively, the UE's 4G and 5G connections might both support downlink scheduled communications to the UE but just one of those connections (perhaps just the 5G connection, or just the 4G connection) might support uplink scheduled communications to the UE. Regardless, in example EN-DC service, the UE would be concurrently connected with and served by the 4G base station and the 5G base station.

Per the present disclosure in line with the discussion above, as between EN-DC service and standalone 4G service, the 4G base station could be set to reserve 4G carrier 16 for use in providing EN-DC service and to reserve 4G carrier 18 for use in providing standalone 4G service. This could be a program setting configured into the 4G base station, by engineering input or otherwise, and it could be a setting that the 4G base station is configured to apply at all times or just at scheduled times, such as at times of day when such carrier reservation might be deemed to be particularly useful or the like.

To apply these carrier reservation settings in practice, in line with the discussion above, the 4G base station could refer to a UE's capabilities data when the UE connects with the 4G base station on a given carrier or while the UE is so connected with the 4G base station, and the 4G base station could take one action or another based on whether or not the UE supports EN-DC and based on which carrier the UE is connected on.

For instance, consider a scenario where a UE connects with the 4G base station on carrier 16 that the 4G base reserves for use in providing EN-DC service. If the 4G base station determines that the UE is EN-DC capable (e.g., if the UE is UE 36), then, based on the carrier being reserved for use in providing EN-DC service and the UE being EN-DC capable, the 4G base station could responsively proceed to provide the UE with 4G service on carrier 16 and may set up EN-DC service for the UE with the UE having a 4G connection on carrier 16 and a 5G connection on carrier 22. But if the 4G base station determines that the UE is not EN-DC capable (e.g., if the UE is UE 38), then, based on the carrier being reserved for use in providing EN-DC service and the UE not being EN-DC capable, the 4G base station could responsively transfer the UE from being connected on carrier 16 to instead being connected on carrier 18 that the base station reserves for use in providing standalone 4G service and may then provide the UE with 4G service on carrier 18.

Alternatively, consider a scenario where a UE connects with the 4G base station on carrier 18 that the 4G base reserves for use in providing standalone 4G service. If the 4G base station determines that the UE is EN-DC capable (e.g., if the UE is UE 36), then, based on the carrier being reserved for use in providing standalone 4G service and the UE being EN-DC capable, the 4G base station could responsively transfer the UE from being connected on carrier 18 to instead being connected on carrier 16 that the base station reserves for use in providing EN-DC service and may and may set up EN-DC service for the UE with the UE having a 4G connection on carrier 16 and a 5G connection on carrier 22. But if the 4G base station determines that the UE is not EN-DC capable (e.g., if the UE is UE 38), then, based on the carrier being reserved for use in providing 4G standalone service and the UE not being EN-DC capable, the 4G base station could responsively proceed to provide the UE with 4G service on carrier 16.

To transfer the UE from being connected with the 4G base station on a first carrier (e.g., either one of carriers 14, 16) to being connected with the 4G base station on a second carrier (e.g., the other of carriers 14, 16), the 4G base station could transmit to the UE an RRC connection-reconfiguration message that redirects the UE accordingly, the UE could therefore tune from the first carrier to the second carrier, and the 4G base station could update the UE context record to indicate that the base station is now serving the UE on the second carrier. The 4G base station could then serve the UE on the second carrier in the manner discussed above.

In an alternative implementation as noted above, the 4G base station could be configured to not advertise that the 4G base station provides service on carrier 16 that the 4G base station reserves for use in providing EN-DC service. For example, the 4G base station could be configured to not broadcast a synchronization signal on carrier 16, or the 4G could take other such action so that UEs would not discover coverage of the 4G base station on that carrier and would thus not initially connect with the base station on that carrier. Considering just carriers 14 and 16, all UEs scanning for 4G coverage in cell site 12 might thus discover coverage of the 4G base station on carrier 18 and therefore connect with the base station that carrier 18. For each such UE, the base station could then carry out the process as described above to determine whether to proceed to serve the UE on the carrier 18 (e.g., responsive to the UE not being EN-DC capable) or rather to transfer the UE to be connected with the 4G base station instead on carrier 16 (e.g., responsive to the UE being EN-DC capable).

Note also that the 4G base station might provide a UE with carrier-aggregation service on a combination of multiple 4G carriers, such as concurrently on both carrier 16 and carrier 18. In that case, the UE would be technically connected with the 4G base station on just one of those carriers, which would be deemed the UE's primary component carrier for the carrier-aggregation service and might be the anchor for RRC signaling and user-plane scheduling signaling with the 4G base station. Each other carrier, on the other hand would serve merely as a secondary carrier for the carrier-aggregation service, to provide added bandwidth so as to facilitate increase peak data rate of communication.

At issue in this carrier-aggregation context might thus be which of the carriers on which 4G base station is providing the UE with carrier-aggregation service should be the UE's primary component carrier, i.e., the carrier on which the UE is technically connected with the 4G base station. If the UE is connected on a given such carrier (thus as the UE's primary component carrier), the 4G base station could carry out the same process as discussed above to determine whether to retain the UE's connection on that carrier and provide the UE with 4G service on that carrier, or rather to transfer the UE to be connected instead on another carrier and to provide the UE with 4G service on that other carrier.

Figure 2:
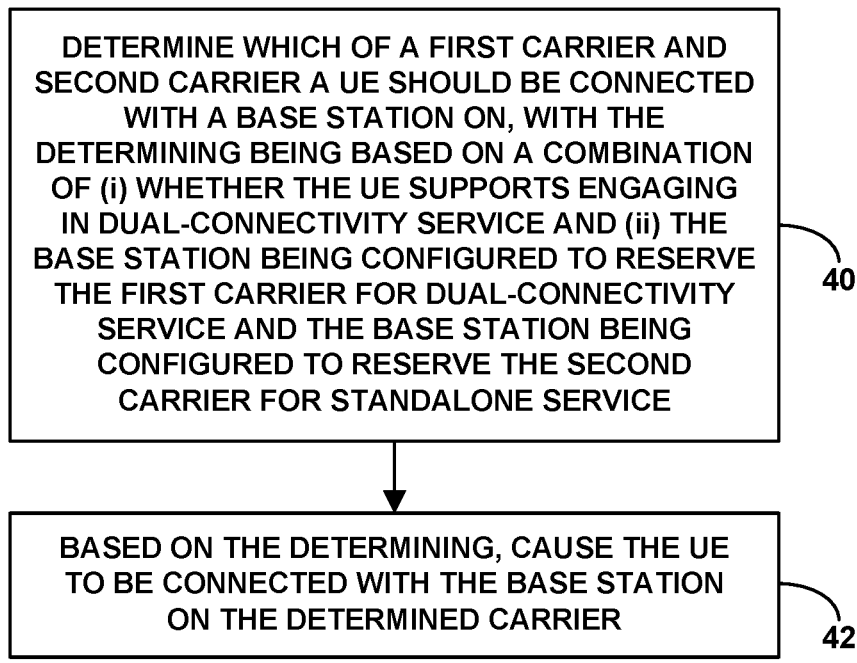
FIG. 2 is a flow chart depicting an example method in accordance with the present disclosure.

FIG. 2 is a flow chart depicting a method that can be carried out in accordance with the present disclosure, to control carrier assignment by a base station such as base station 12 for instance. The base station is configured to operate on a first carrier and on a second carrier, such as by being arranged to provide service respectively on each carrier as discussed above for instance. Further, the base station is configured to reserve the first carrier for dual-connectivity service and the base station is configured to reserve the second carrier for standalone service, such as by being programmed with logic (e.g., program instructions executable by a processor) or settings accordingly.

As shown in FIG. 2, at block 40, the method includes the base station determining which of the first carrier and second carrier a UE should be connected with the base station on, with the determining being based on a combination of (i) whether the UE supports engaging in the dual-connectivity service and (ii) the base station being configured to reserve the first carrier for the dual-connectivity service and the base station being configured to reserve the second carrier for the standalone service. And at block 42, the method includes, based on the determining, causing the UE to be connected with the base station on the determined carrier.

In line with the discussion above, the base station could be configured to operate in accordance with a first RAT respectively on each of the first carrier and the second carrier. And in that case, the dual-connectivity service could involve service of a UE concurrently (i) by the base station in accordance with the first RAT and (ii) by another base station in accordance with a second RAT. Whereas, the standalone service could involve service of a UE by the base station in accordance with the first RAT without concurrent service of the UE by another base station in accordance with the second RAT. Further, as discussed above by way of example, the first RAT could 4G LTE, the second RAT could be 5G NR, and the dual-connectivity service could be EN-DC.

As additionally discussed above, the act of determining which of the first carrier and the second carrier the UE should be connected with the base station on could occur when the UE is currently connected with the base station on one of those two carriers, such as upon establishment of that connection (e.g., once the UE has connected and attached if appropriate). And in that case, the act of causing the UE to be connected with the base station on the determined carrier could be based on whether the carrier on which the UE is currently connected with the base station is the determined carrier.

In particular, if the UE is currently connected with the base station on a carrier that is not the determined carrier, then the base station could cause the UE to transition from being connected with the base station on carrier on which the UE is currently connected with the base station to being connected with the base station instead on the determined carrier. Whereas, if the UE is currently connected with the base station on the determined carrier, then the base station could maintain connection of the UE with the base station on the determined carrier, i.e., by forgoing transition of the UE to be connected on the other carrier.

Further, if the UE is currently connected with the base station on the second carrier that the base station reserves for the standalone service, and if the UE supports the dual-connectivity service, then the act of causing of the UE to transition from being connected with the base station on second carrier to being connected with the base station instead on the first carrier could occur in preparation for setting up the dual-connectivity service for the UE. For instance, this could occur in response to the base station encountering a trigger condition for setting up dual-connectivity service for the UE, such as in response to determining that the UE will engage in threshold heavy communication traffic that might benefit from dual-connectivity service, among other possibilities.

As further discussed above, the method could additionally include the base station forgoing from advertising coverage of the base station on the first carrier, such as by not broadcasting a synchronization signal on that carrier, so as to prevent initial UE-connectivity with the base station on the first carrier. And in that case, if the UE is currently connected with the base station on the second carrier and the UE supports the dual-connectivity service, the act of causing the UE to be served on the determined carrier could involve causing the UE to transition from being connected with the base station on second carrier to being connected with the base station instead on the first carrier.

In addition, as discussed above, the act of determining which of the first carrier and second carrier a UE should be connected with the base station on could include the base station determining whether the UE supports engaging in the dual-connectivity service, which could involve referring to UE-capabilities data that indicates whether the UE supports engaging in the dual-connectivity service.

And as further discussed above, the method could be carried out in an arrangement in which the base station provides the UE with carrier-aggregation service, in which case the question of which carrier the UE should be connected with the base station on could be a question of which carrier should be the primary component carrier of the carrier-aggregation service, as that is the carrier on which the UE is technically connected with the base station.

Figure 3:
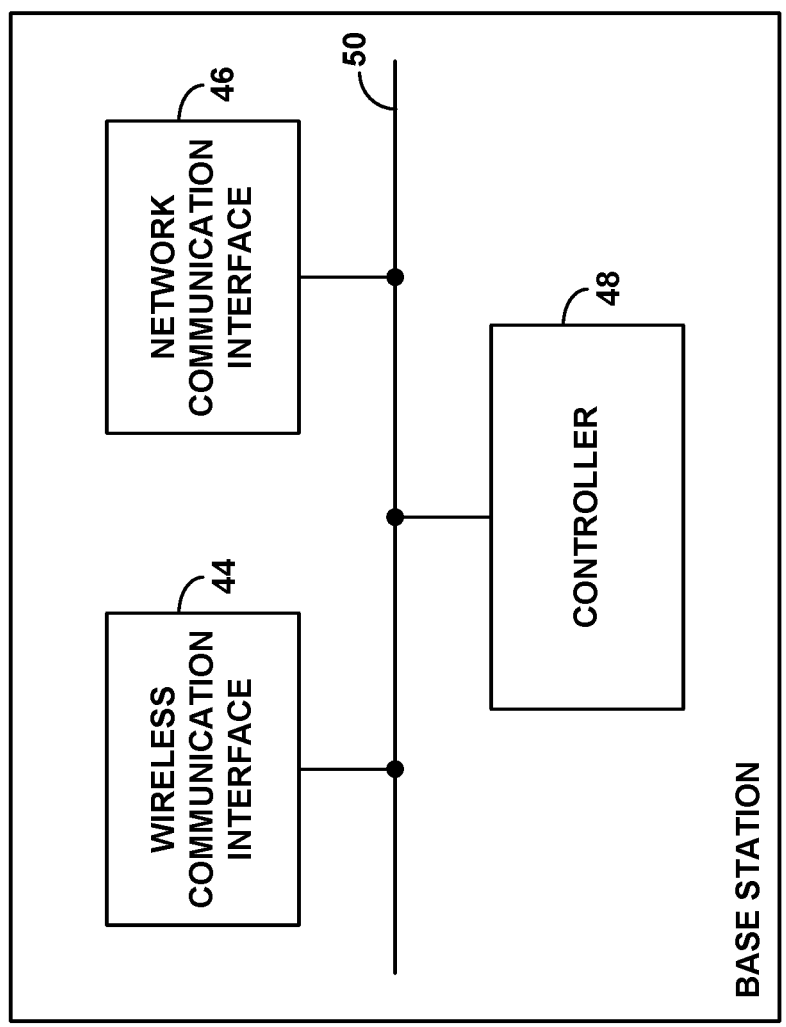
FIG. 3 is a simplified block diagram of an example base station operable in accordance with the present disclosure.

Finally, FIG. 3 is simplified block diagram an example base station that could be operable in accordance with the present disclosure. As shown, the example base station includes a wireless communication interface 44, a network communication interface 46, and a controller 48, all of which could be integrated together and/or communicatively linked together by a system bus, network, or other connection mechanism 50.

In this example arrangement, the wireless communication interface 44 could be configured to provide cellular coverage on a first carrier and on a second carrier. As such, the wireless communication interface 44 could comprise an antenna structure, which could be tower mounted or could take other forms, and associated components such as a power amplifier and a wireless transceiver, to facilitate operation as described above. Further, network communication interface 46 could comprise a wired or wireless interface, such as an Ethernet network communication interface, configured to support communication with other entities, such as entities core network 12.

Controller 48 could then comprise control logic to cause the base station to carry out particular operations including those discussed above. As such, the controller 48 could take various forms, including but not limited to a processing unit including one or more processors (e.g., general purpose microprocessors and/or dedicated processing units) and non-transitory data storage (e.g., one or more volatile and/or non-volatile storage components, such as magnetic, optical, or flash storage) holding, storing, encoded with, or otherwise embodying or having program instructions executable by the processing unit to cause the base station to carry out various operations described herein. It should also be understood that the present disclosure contemplates a non-transitory computer readable medium holding, storing, encoded with, or otherwise embodying program instructions executable to carry out such operations as well.

Various features described above can be applied in this context as well, and vice versa.

Exemplary embodiments have been described above. Those skilled in the art will understand, however, that changes and modifications may be made to these embodiments without departing from the true scope and spirit of the invention.

We claim:

1. A method for controlling carrier assignment by a base station, wherein the base station is configured to operate on a first carrier and on a second carrier, and wherein the base station is configured to reserve the first carrier for dual-connectivity service and the base station is configured to reserve the second carrier for standalone service, the method comprising:

determining, by the base station, which of the first carrier and second carrier a UE should be connected with the base station on, wherein the determining is based on a combination of (i) whether the UE supports engaging in the dual-connectivity service and (ii) the base station being configured to reserve the first carrier for the dual-connectivity service and the base station being configured to reserve the second carrier for the standalone service; and based on the determining, causing the UE to be connected with the base station on the determined carrier.

2. The method of claim 1,
wherein the base station is configured to operate in accordance with a first radio access technology (RAT) on each of the first carrier and the second carrier,
wherein the dual-connectivity service comprises service concurrently (i) by the base station in accordance with the first RAT and (ii) by another base station in accordance with a second RAT, and
wherein the standalone service comprises service by the base station in accordance with the first RAT without concurrent service by another base station in accordance with the second RAT.

3. The method of claim 2, wherein the first RAT is 4G LTE, wherein the second RAT is 5G NR, and wherein the dual-connectivity service is EN-DC.

4. The method of claim 1, wherein determining which of the first carrier and the second carrier the UE should be connected with the base station on occurs when the UE is currently connected with the base station on one of the first carrier and second carrier, and wherein causing the UE to be connected with the base station on the determined carrier is based on whether the carrier on which the UE is currently connected with the base station is the determined carrier and includes:
if the UE is currently connected with the base station on a carrier that is not the determined carrier, then causing the UE to transition from being connected with the base station on carrier on which the UE is currently connected with the base station to being connected with the base station instead on the determined carrier; and
if the UE is currently connected with the base station on the determined carrier, then maintaining connection of the UE with the base station on the determined carrier.

5. The method of claim 4, carried out upon connection of the UE with the base station.

6. The method of claim 4, wherein the UE is currently connected with the base station on the second carrier that the base station reserves for the standalone service, wherein the UE supports the dual-connectivity service, and wherein the causing of the UE to transition from being connected with the base station on second carrier to being connected with the base station instead on the first carrier occurs in preparation for setting up the dual-connectivity service for the UE.

7. The method of claim 4, further comprising forgoing by the base station from advertising coverage of the base station on the first carrier, wherein the forgoing by the base station from advertising coverage of the base station on the first carrier prevents initial UE-connectivity with the base station on the first carrier,
wherein the UE is currently connected with the base station on the second carrier, wherein the UE supports the dual-connectivity service, and wherein causing the UE to be served on the determined carrier comprises causing the UE to transition from being connected with the base station on second carrier to being connected with the base station instead on the first carrier.

8. The method of claim 1, wherein the determining which of the first carrier and second carrier a UE should be connected with the base station on includes determining whether the UE supports engaging in the dual-connectivity service.

9. The method of claim 8, wherein determining whether the UE supports engaging in the dual-connectivity service comprises referring to UE-capabilities data that indicates whether the UE supports engaging in the dual-connectivity service.

10. The method of claim 1, wherein the base station provides the UE with carrier-aggregation service, and wherein the carrier on which the UE is connected with the base station is a primary component carrier of the carrier-aggregation service.

11. A base station configured to control carrier assignment, the base station comprising:
a wireless communication interface through which the base station is configured to provide wireless communication service, wherein the base station is configured to operate on a first carrier and on a second carrier,
a network communication interface though which the base station is configured to communicate on a core network; and
a controller for controlling the carrier assignment by the base station wherein the controller is configured to reserve the first carrier for dual-connectivity service and the controller is configured to reserve the second carrier for standalone service, and the controller is configured to carry out operations including:
determining which of the first carrier and second carrier a UE should be connected with the base station on, the determining being based on a combination of (i) whether the UE supports engaging in the dual-connectivity service and (ii) the controller being configured to reserve the first carrier for the dual-connectivity service and the controller being configured to reserve the second carrier for the standalone service, and
based on the determining, causing the UE to be connected with the base station on the determined carrier.

12. The base station of claim 11,
wherein the base station is configured to operate in accordance with a first radio access technology (RAT) on each of the first carrier and the second carrier,
wherein the dual-connectivity service comprises service concurrently (i) by the base station in accordance with the first RAT and (ii) by another base station in accordance with a second RAT, and
wherein the standalone service comprises service by the base station in accordance with the first RAT without concurrent service by another base station in accordance with the second RAT.

13. The base station of claim 12, wherein the first RAT is 4G LTE, wherein the second RAT is 5G NR, and wherein the dual-connectivity service is EN-DC.

14. The base station of claim 11, wherein the controller is configured to carry out the determining of which of the first carrier and the second carrier the UE should be connected with the base station on when the UE is currently connected with the base station on one of the first carrier and second carrier, and wherein causing the UE to be connected with the base station on the determined carrier is based on whether the carrier on which the UE is currently connected with the base station is the determined carrier and includes:
if the UE is currently connected with the base station on a carrier that is not the determined carrier, then causing the UE to transition from being connected with the base station on carrier on which the UE is currently connected with the base station to being connected with the base station instead on the determined carrier; and
if the UE is currently connected with the base station on the determined carrier, then maintaining connection of the UE with the base station on the determined carrier.

15. The base station of claim 14, wherein carrying out the determining when the UE is currently connected with the base station involves carrying out the determining when the UE is currently connected with the base station on the second carrier that the base station reserves for the stand-alone service, wherein the UE supports the dual-connectivity service, and wherein the controller causes the UE to transition from being connected with the base station on second carrier to being connected with the base station instead on the first carrier in preparation for setting up the dual-connectivity service for the UE.

* * * * *